United States Patent
Chen et al.

(10) Patent No.: US 6,339,453 B1
(45) Date of Patent: Jan. 15, 2002

(54) TELEVISION SYSTEM HAVING REPLACEABLE GRAPHICS USER INTERFACE ARCHITECTURE

(75) Inventors: Lei Chen, Milpitas, CA (US); Hiroyuki Chimoto, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/359,792

(22) Filed: Jul. 26, 1999

(51) Int. Cl.[7] ............................................. H04N 5/445
(52) U.S. Cl. .................. 348/589; 348/563; 348/569; 348/600
(58) Field of Search ................. 348/589, 563, 348/564, 565, 600, 725, 734, 569; H04N 5/445, 5/50

(56) References Cited

U.S. PATENT DOCUMENTS 5,959,687 A * 9/1999 Dinwiddie .................. 348/564
5,969,770 A * 10/1999 Horton ....................... 348/569
6,035,037 A * 3/2000 Chaney ...................... 348/565

* cited by examiner

*Primary Examiner*—Sherrie Hsia
(74) *Attorney, Agent, or Firm*—Finnegan, Henderson, Farabow, Garrett & Dunner, L.L.P.

(57) ABSTRACT

A television system includes a television and an external media module. The television includes a television control unit capable of generating a control signal, apparatus for receiving a video signal, a media controller for generating a graphics signal, and a display unit for displaying either the video signal or a combined video and graphics signal. The external media module, external to the television, is connectable via an interface with the media controller, and performs a graphics on-screen display application in accordance with the television control signal.

14 Claims, 5 Drawing Sheets

TELEVISION SYSTEM HAVING REPLACEABLE GRAPHICS USER INTERFACE ARCHITECTURE

BACKGROUND OF THE INVENTION

1. Field of the Invention

The present invention relates to a television system having a graphics user interface. More specifically, the present invention relates to a television system having a graphics user interface which can be replaced and upgraded easily.

2. Description of the Related Art

The architecture of a conventional television system is depicted in FIG. 5. A television, generally designated by the reference numeral 10, includes a tuner 12 for receiving a video signal "V". An audio/video demodulator 14 demodulates an audio portion "a" from signal "V". The video signal "V" proceeds through a video and color signal demodulator 16 and a backend processor 18, to be displayed on a display unit 20. The audio portion "a" proceeds via an audio decoder 22 and audio amplifier 24 to a speaker unit 26.

The backend processor 18 processes the following functions: video switching, picture-in-picture (PIP) display, and graphics overlay. Graphics overlay includes mixing a graphics signal "G" with the pixels of the video signal "V" to create a combined graphics and video signal, which can also be displayed on the display unit 20. Graphics overlay is performed by a graphics overlay unit 18', integral with backend processor 18. Video switching and PIP are optional features that are not required in all televisions, and will not be further discussed.

In the conventional television system, a graphics signal "G" is generated in a micro-processor unit (MPU) 28, in accordance with a television control signal "C" generated by a controller 30, e.g., a remote control. The MPU 28 includes an on-screen display (OSD) application for controlling the graphics signal "G" in accordance with control signal "C", including generation of graphics feedback on the display unit 20 for all TV control signals (e.g., display of channel, display of volume level, and so on). The OSD application is stored in a read only memory (ROM) 32.

The conventional television system described above has several shortcomings. The OSD application cannot be replaced without replacing ROM 32. In addition, if the television operator desires a more complex OSD application, e.g., one with higher quality graphics, it might also be necessary to replace the graphics overlay unit 18' because the size of the ROM and the function of the graphics overlay unit are selected at the time of television assembly to meet the selected graphics requirements, and the selected complexity of the OSD application. Replacement of either component is time consuming and expensive.

A new graphics user interface architecture is desirable in order to replace or upgrade the OSD application cheaply and easily.

SUMMARY OF THE INVENTION

The present invention comprises a television system having an improved graphics user interface architecture, that corrects one or more problems of the related art.

In accordance with the purpose of the invention, a television system comprises a television, including (a) a television control unit capable of generating a television control signal; (b) means for receiving a video signal; (c) a media controller for generating a graphics signal; and (d) a display unit for displaying either the video signal or the combined video signal and graphics signal. A media module, external to the television and connectable via an interface with the media controller, performs a graphical on-screen display application in accordance with the television control signal.

Additional advantages of the invention will be set forth in the description which follows, and in part will be obvious from the description, or may be learned by practice of the invention. The objects and advantages of the invention may be realized and obtained by means of the combinations particularly pointed out in the appended claims.

BRIEF DESCRIPTION OF THE DRAWINGS

The accompanying drawings, which are incorporated and constitute part of the specification, illustrate a presently preferred embodiment of the invention. Together with the general description above, and the detailed description below, the drawings serve to explain the principles of the invention.

DETAILED DESCRIPTION OF THE PREFERRED EMBODIMENT

Figure 1:
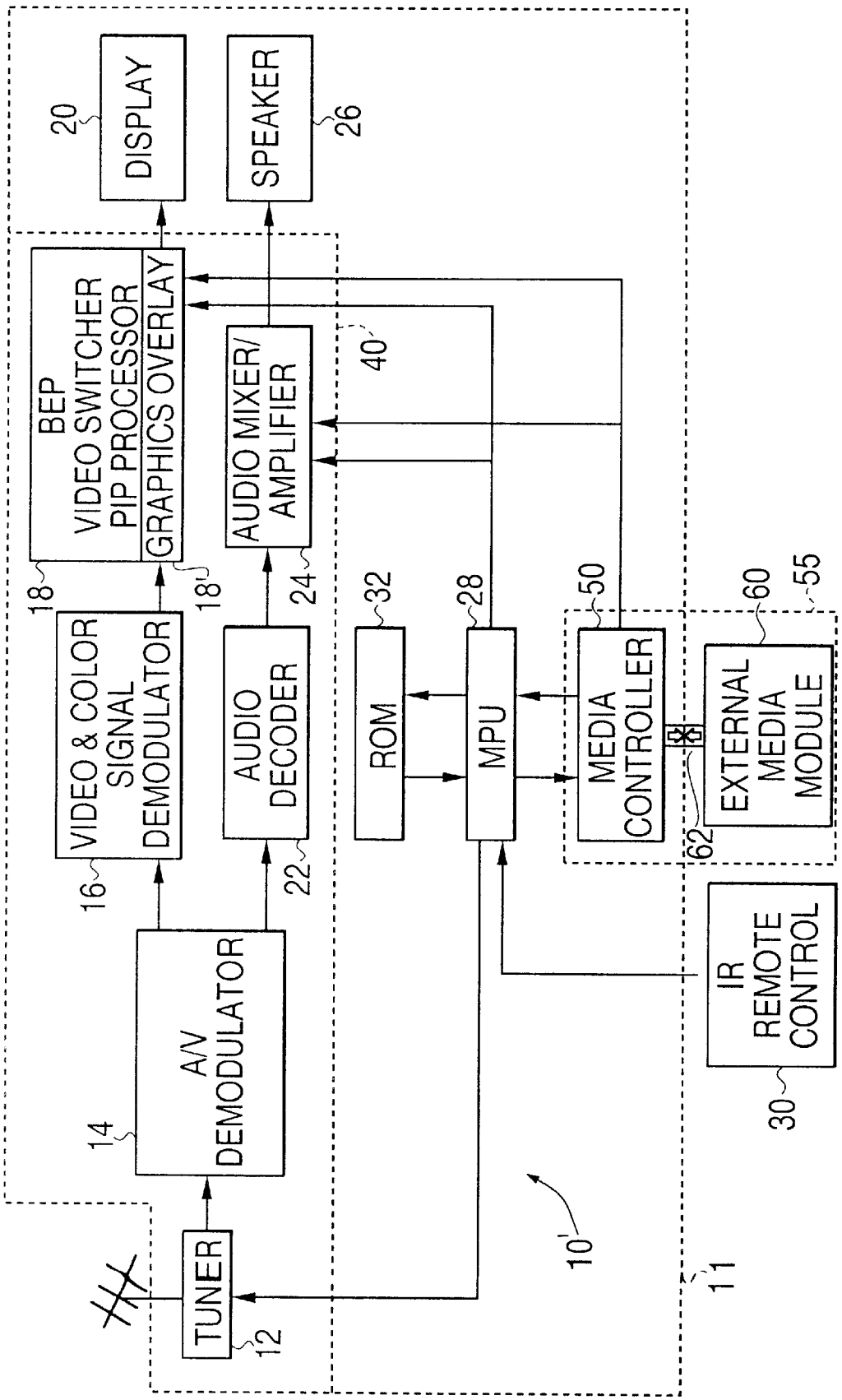
FIG. 1 is a diagram depicting a television system having a replaceable graphics user interface architecture in accordance with the invention.

Reference will now be made to the preferred embodiment of the invention as illustrated in the accompanying drawings, in which like reference characters designate like or corresponding parts throughout the several drawings.

In accordance with the invention, as shown in FIG. 1, a television 10' includes a housing 11 enclosing the components of the television.

Television 10' includes a television control unit 30 capable of generating a television control signal. As shown in FIG. 1, television control unit 30 is provided for generating a plurality of control signals "C". In the preferred embodiment, control unit 30 is a conventional remote control unit, capable of generating at least a channel control signal $C_c$ and an audio (volume) control signal $C_a$. In addition, control unit 30 is capable of generating a graphics control signal $C_g$. Other control signals are also possible. However, the invention is not restricted to use of a remote control. The television control unit 30 may also be provided integral within the television housing 11 (e.g., user interface buttons positioned on the housing), on a video recorder unit connected to the television system, or any other convenient location.

The television further comprises a means for receiving a video signal "V". As broadly depicted in FIG. 1, a video reception and processing section 40 of television 10' preferably includes a tuner 12, an audio-video demodulator 14, a video and color signal demodulator 16, a backend processor 18, an audio decoder 22, and an audio mix/amplifier 24. The backend processor 18 preferably includes a graphic overlay unit 18', and may also include a video switching unit and a PIP processor, as desired. The components in video reception and processing section 40 are conventional and will not be discussed in further detail.

Control unit 30 transmits control signals C to MPU 28, which interfaces with a ROM 32. MPU 28 processes the control signals C to translate the signals instructions for controlling the production of video and audio signals.

In accordance with the invention, television 11 further includes media signal generator (MSG) 55. MSG 55 provides the function of generating graphical and audio signals to be displayed by display 20 or reproduced by speaker 26 respectively. The function of generating such signals, was previously carried out as one of the multiple functions of MPU 28. In accordance with the invention, these computation intensive tasks are removed from MPU 28, thereby freeing up processing power in MPU 28 to perform other tasks such as sophisticated OSD application.

As shown in FIG. 1 MSG 55 comprises two elements, a media controller 50 internal to television housing 11 and an external media module 60 external to television housing 11.

Figure 2:
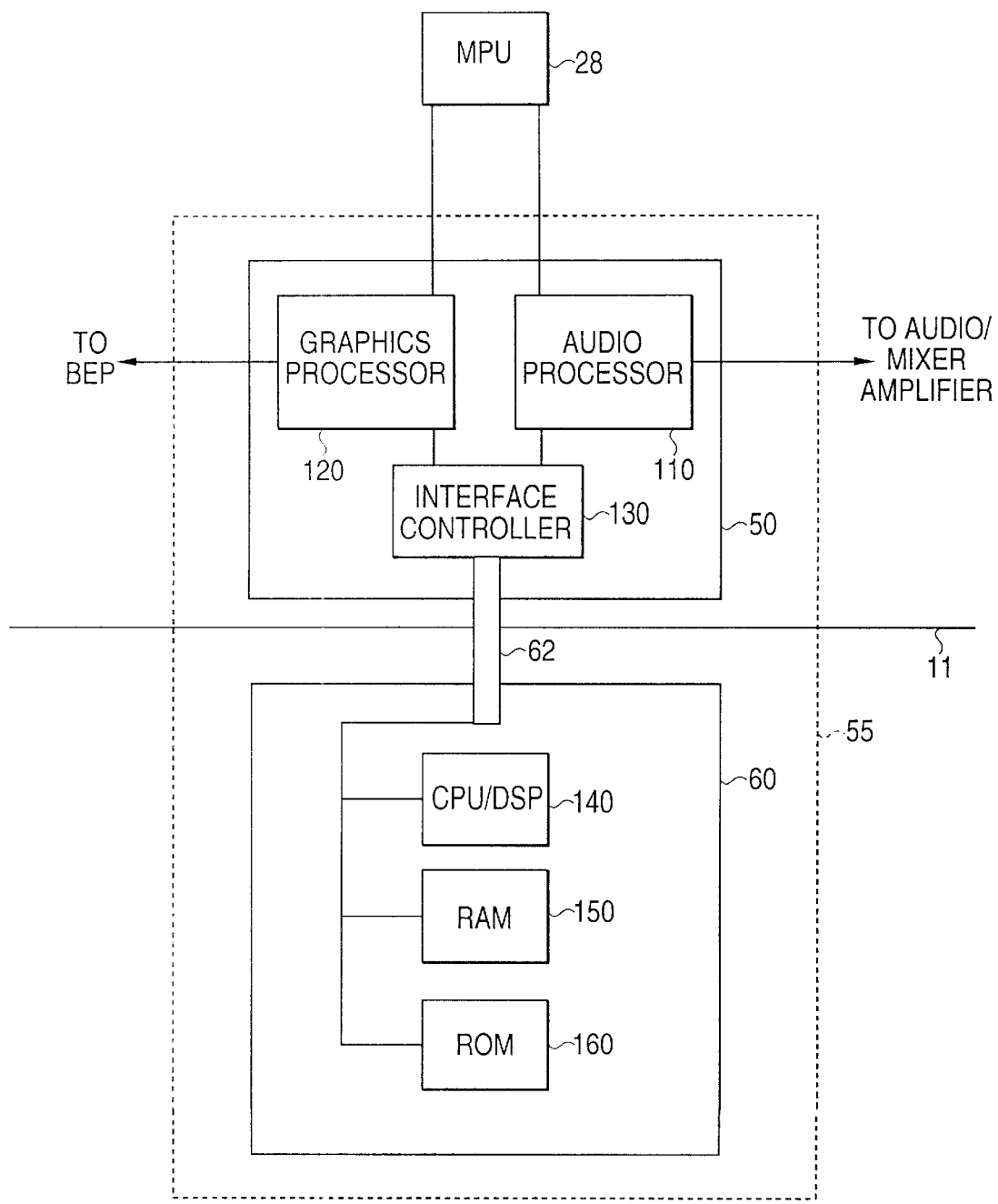
FIG. 2 is a diagram depicting a first embodiment of a media signal generator in accordance with the invention.

FIG. 2 provides a detailed diagram of a first embodiment of MSG 55. Media controller 50 includes a graphics processor 120, an audio processor 110 and a bus interface controller 130. In an alternate embodiment the graphical and audio processing function are combined in a single processing unit. External media module 60 includes a CPU/DSP 140, RAM 150, and ROM 160. External media module 60 preferably takes the form of a cartridge or disk that is insertable into a cartridge holder or disk holder provided on housing 11.

Communications between media controller 50 and external media module 60 are provided via bus interface 62. Bus interface controller 130 of media controller 50 manages external bus 62 by way of arbitrating access through a shared common interface from the media controller 50 to the different modules ROM 160, RAM 150 and CPU/DSP of external media module 60.

External media module 60 stores a program for creating a graphical on-screen display (OSD) and for creating audio effects within ROM 160. The OSD program is responsible for generating graphics signals G that produce graphical feedback on display unit 20 in response to television control signals C from television control 30. Exemplary effects generated for display by an OSD program include graphical representations of the current volume level or channel.

An OSD application generally displays instruction menus and graphics objects for showing volume level, channel selection, etc. The display of such objects requires drawing different characters to form words, phrases and sentences. Each character on the screen can be rendered by either using a pre-programmed and stored image that is fixed in size, shape and font, or dynamically created pixel by pixel in varying sizes and shapes. In the case of using pre-programmed characters, images of all the characters must be stored in a ROM, and the size of the ROM required depends on the characteristics of the stored character set.

As shown in FIG. 2, MSG 55 has three processing units, graphics processor 120, audio processor 110 and CPU/DSP 140. Graphics processor 120 receives requests from MPU 28 to generate selected graphical effects for display on display 20. Exemplary graphical effects include lines, geometrical shapes and pre-programmed images such as sprites (graphical figures for display). Audio processor 110 receives requests from MPU 28 to provide selected audio effects for reproduction by speaker 26. The audio effects are generally stored in a memory such as ROM 160 of media module 60 or a memory internal to television 10'. Audio processor 110 can also dynamically generate audio signals at run time. Exemplary audio effects include natural sounds, synthetic sounds and speech sounds.

The processing functions of MSG 55 can be distributed between the processors of media controller 50 and external media module 60 in a number of alternative arrangements. In a preferred embodiment, graphics processor 120 and audio processor 110 directly access ROM 160 and RAM 150 to obtain the necessary program information to carry out the requests from MPU 28. Alternatively, graphics processor 120 and audio processor 110 send data acquisition requests to CPU/DSP 140, which accesses the information from ROM 160 or RAM 150 and forwards the information to the proper processor. It will be obvious to those skilled in the art that a number of alternative arrangements exist for distributing processing functions between graphics processor 120, audio processor 110 and CPU/DSP 140.

Because the processors 110, 120 of media controller 50 are connected internal to television 10'; it would impractical to upgrade them. Should it be undesirable to process certain requests on graphical processor 120 or audio processor 110, e.g., the production of certain visual or audio effects requests from MPU 28 might exceed the processing power of the processors, those processing functions could be distributed to CPU/DSP 140. In such an arrangement, CPU/DSP 140 could be specially designed to support functions that cannot be performed by the processing units 110, 120 of media controller 50. Because over time the complexity of the function required of processors tend to increase, by distributing functions to the external processing unit designed specifically to support the functions not supportable by the internal processors, the functionality of the television can be greatly increased without having to alter the internal configuration of the television.

Figure 4:
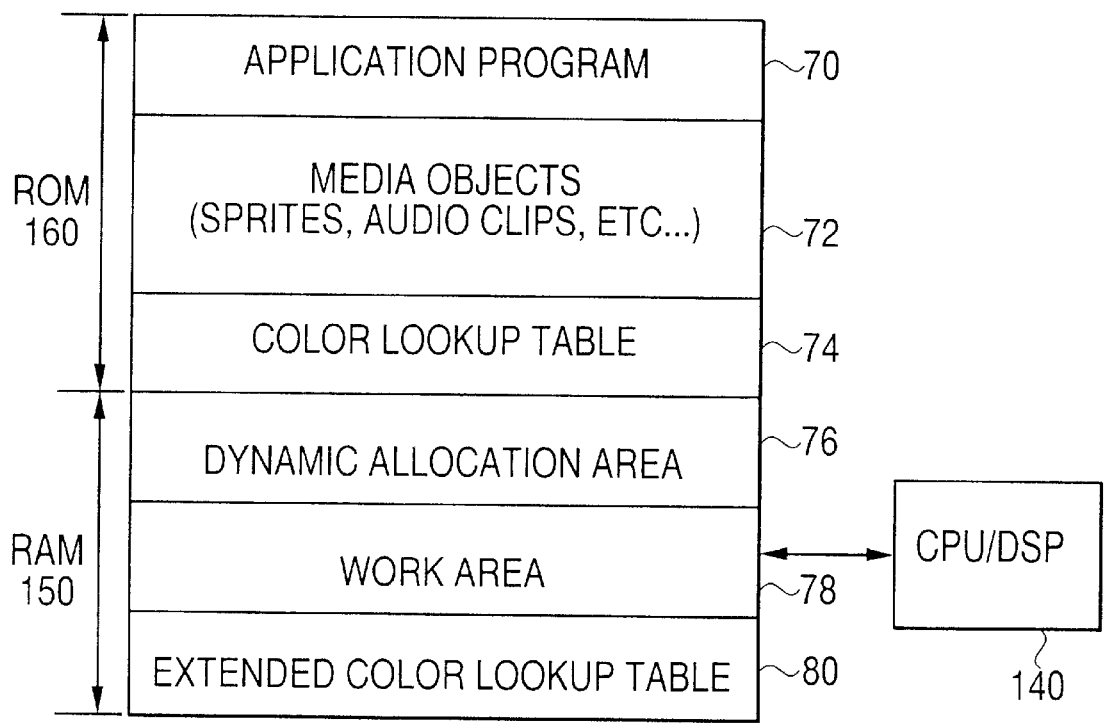
FIG. 4 is a diagram depicting the memory address space of the external media module.
Figure 5:
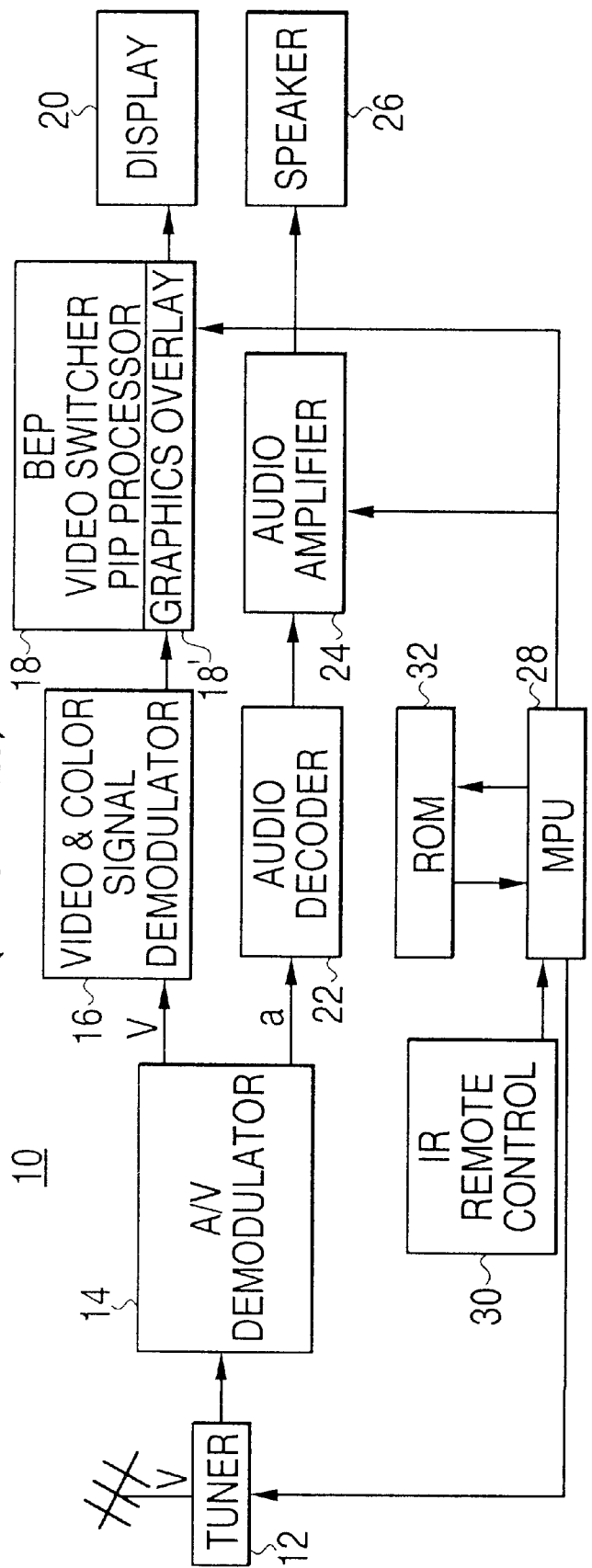
FIG. 5 is a diagram depicting a television system with a conventional graphic user interface architecture.

ROM 160 includes reusable media objects that can be accessed by CPU/DSP 140, graphics processor 120 or audio processor 110. As shown in FIG. 4, ROM stores such information as, for example, an on-screen display application program 70, media objects 72 such as sprites and audio clips, and a color lookup table 74.

External media module 60 also includes random access memory (RAM) 150. RAM 150 can be used for the temporary storage of data by CPU/DSP 140, graphics processor 120 and audio processor 110. Examples of data for storage include dynamic media objects 76, a work area 78 and an extended color lookup table 80. As discussed above, a ROM permits the storage of pre-programmed data including character data, but does not permit the dynamic construction of characters of varying font and size. The inclusion of a RAM permits the temporary storage of dynamically created images of objects for display.

Figure 3:
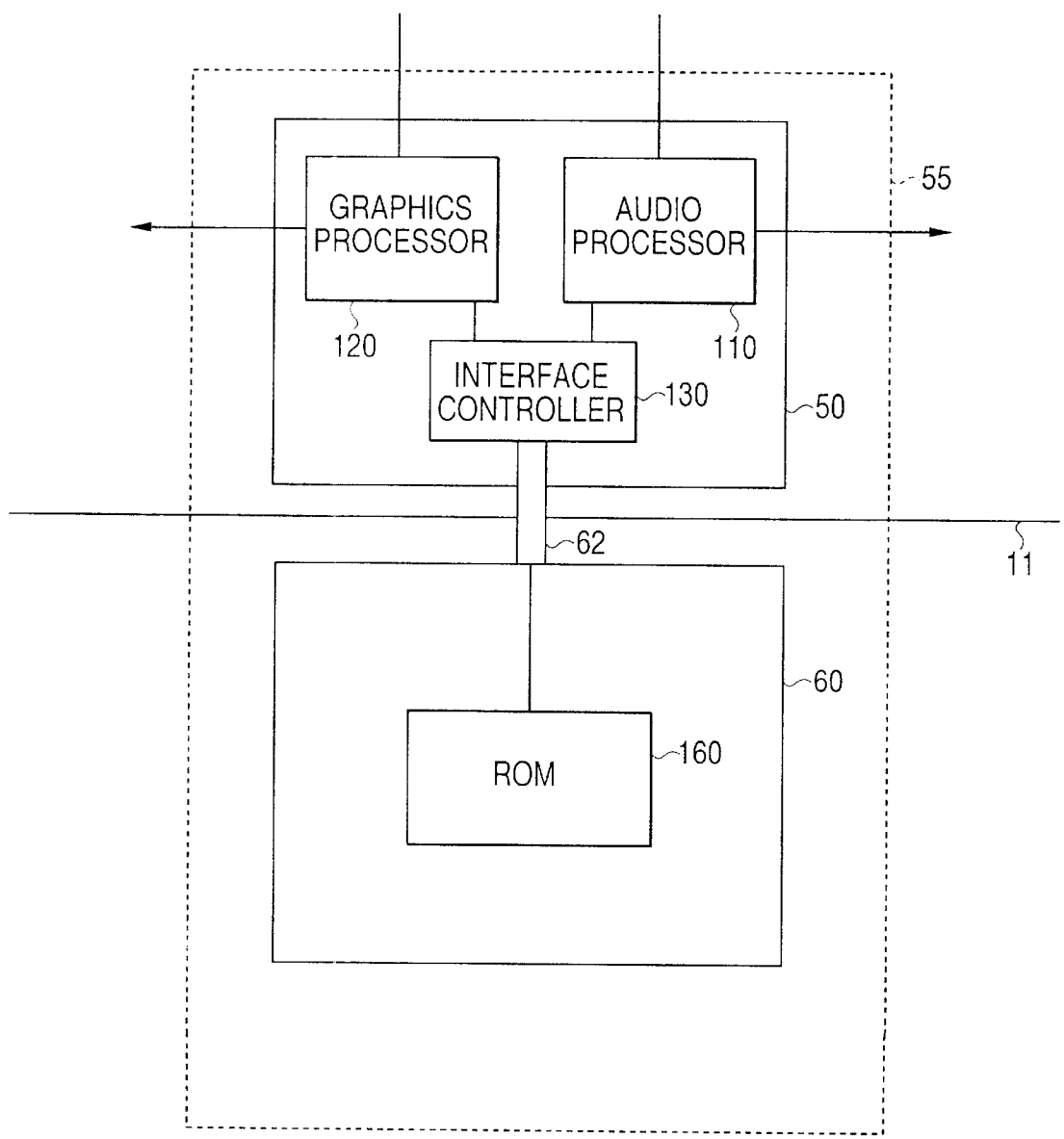
FIG. 3 is a diagram depicting a second embodiment of a media signal generator in accordance with the invention.

A second embodiment in accordance with the invention is shown in FIG. 3. In this preferred embodiment, external media module 60 contains only ROM 160 containing pre-programmed objects. In this static configuration, the look and feel of the OSD program is fixed. Graphics processor 120 and audio processor 110 access ROM 160 via bus interface 62 in order to reproduce selected objects from memory.

Because the OSD application is provided in an external media module 60, capable of communicating via an interface 62 when connected to a media controller 50, the graphics user interface capability can be replaced and/or upgraded simply by replacing external media module 60 with a new and/or upgraded external media module 60. There is no need to change out MPU 28 or internal ROM 32 in order to replace or upgrade the graphics capability. The graphics user interface can be changed or upgraded cheaply and easily, allowing a different graphics user interface to be implemented without obtaining a new television.

Additional advantages and modifications will readily occur to those skilled in the art. The invention in its broader aspects is not limited to the specific details and examples shown and described above. Departures may be made from such details without departing from the spirit or scope of the invention. The scope of the invention is defined by the attached claims and their equivalents.

We claim:

1. A television system comprising:

(a) a television control unit capable of generating a television control signal;

(b) means for receiving a video signal;

(c) a display unit for displaying either the video signal or a combination of the video signal and a graphics signal; and (d) a media signal generator for performing a graphics on-screen display application to generate the graphics signal in accordance with the television control signal, said media signal generator comprising an internal media controller and an external media module.

2. The television system of claim 1, wherein the graphics on-screen display application includes a capability of generating graphics feedback to the display unit.

3. The television system of claim 1, wherein the media module comprises a cartridge insertable into the television.

4. The television system of claim 1, wherein the media module comprises a disk insertable into the television.

5. The television system of claim 1, wherein the media module is replaceable.

6. The television system of claim 1, wherein the media module includes a memory storing a program for the graphics on-screen display application.

7. The television system of claim 6, wherein the memory further stores a plurality of media objects.

8. The television system of claim 6, wherein the memory includes a read only memory.

9. The television system of claim 8, wherein the read only memory stores the program for the graphics on-screen display application, a plurality of fixed media objects, and a color lookup table.

10. The television system of claim 6, wherein the memory includes a random access memory.

11. The television system of claim 10, wherein the random access memory stores a plurality of dynamic media objects, a work area and an extended color lookup table.

12. The television system of claim 6, wherein the memory includes both a read only memory and a random access memory.

13. The television system of claim 1, wherein the media controller comprises a graphics processor, an audio processor and an interface controller.

14. The television system of claim 1, wherein the media module comprises a central processing unit, a random access memory and a read only memory.

* * * * *